United States Patent
Breivik

(10) Patent No.: US 7,600,742 B2
(45) Date of Patent: Oct. 13, 2009

(54) VAPOUR-LIQUID DISTRIBUTION TRAY

(75) Inventor: Rasmus Breivik, Hillerød (DK)

(73) Assignee: Haldor Topsoe A/S, Lyngby (DK)

( * ) Notice: Subject to any disclaimer, the term of this patent is extended or adjusted under 35 U.S.C. 154(b) by 558 days.

(21) Appl. No.: 10/583,561

(22) PCT Filed: Dec. 20, 2004

(86) PCT No.: PCT/EP2004/014485

§ 371 (c)(1), (2), (4) Date: Jun. 19, 2006

(87) PCT Pub. No.: WO2005/068039

PCT Pub. Date: Jul. 28, 2005

(65) Prior Publication Data
US 2007/0145610 A1 Jun. 28, 2007

(30) Foreign Application Priority Data
Jan. 15, 2004 (DK) .............................. 2004 00040

(51) Int. Cl.
*B01F 3/04* (2006.01)
(52) U.S. Cl. .................... 261/110; 261/114.2
(58) Field of Classification Search .................. 261/97, 261/110, 114.1, 114.2, 114.5; 202/158; 203/71
See application file for complete search history.

(56) References Cited

U.S. PATENT DOCUMENTS

| | | | | |
|---|---|---|---|---|
| 2,686,046 | A | | 8/1954 | Green et al. |
| 3,218,249 | A | * | 11/1965 | Ballard et al. ............... 208/108 |
| 4,140,625 | A | | 2/1979 | Jensen |
| 4,931,401 | A | * | 6/1990 | Safi .......................... 435/294.1 |
| 5,158,714 | A | | 10/1992 | Shih et al. |
| 5,683,629 | A | * | 11/1997 | Konijn ....................... 261/79.2 |
| 5,942,162 | A | * | 8/1999 | Gamborg et al. .............. 261/96 |
| 6,098,965 | A | * | 8/2000 | Jacobs et al. ............. 261/114.2 |
| 6,769,672 | B2 | * | 8/2004 | Muller ..................... 261/114.2 |
| 7,004,988 | B2 | * | 2/2006 | Letzel .......................... 55/444 |
| 2002/0175427 | A1 | * | 11/2002 | Jacobs et al. ............. 261/114.2 |
| 2003/0146525 | A1 | | 8/2003 | Jacobs et al. |

\* cited by examiner

*Primary Examiner*—Scott Bushey
(74) *Attorney, Agent, or Firm*—Dickstein Shapiro LLP

(57) ABSTRACT

Liquid-vapour distribution device for use in two-phase concurrent down-flow vessels, having a level, horizontal tray being perforated with holes, each perforation through the horizontal tray being fitted with a vapour lift tube, the vapour lift tube including at least one elongated up-flow leg and one down-flow leg creating at least one up-flow zone and a down-flow zone between the up-flow zone and down-flow zone, and a bluff body being arranged within the transition zone and/or in a region of the upflow or down-flow zone adjacent to the transition zone of the vapour lift tube.

2 Claims, 3 Drawing Sheets

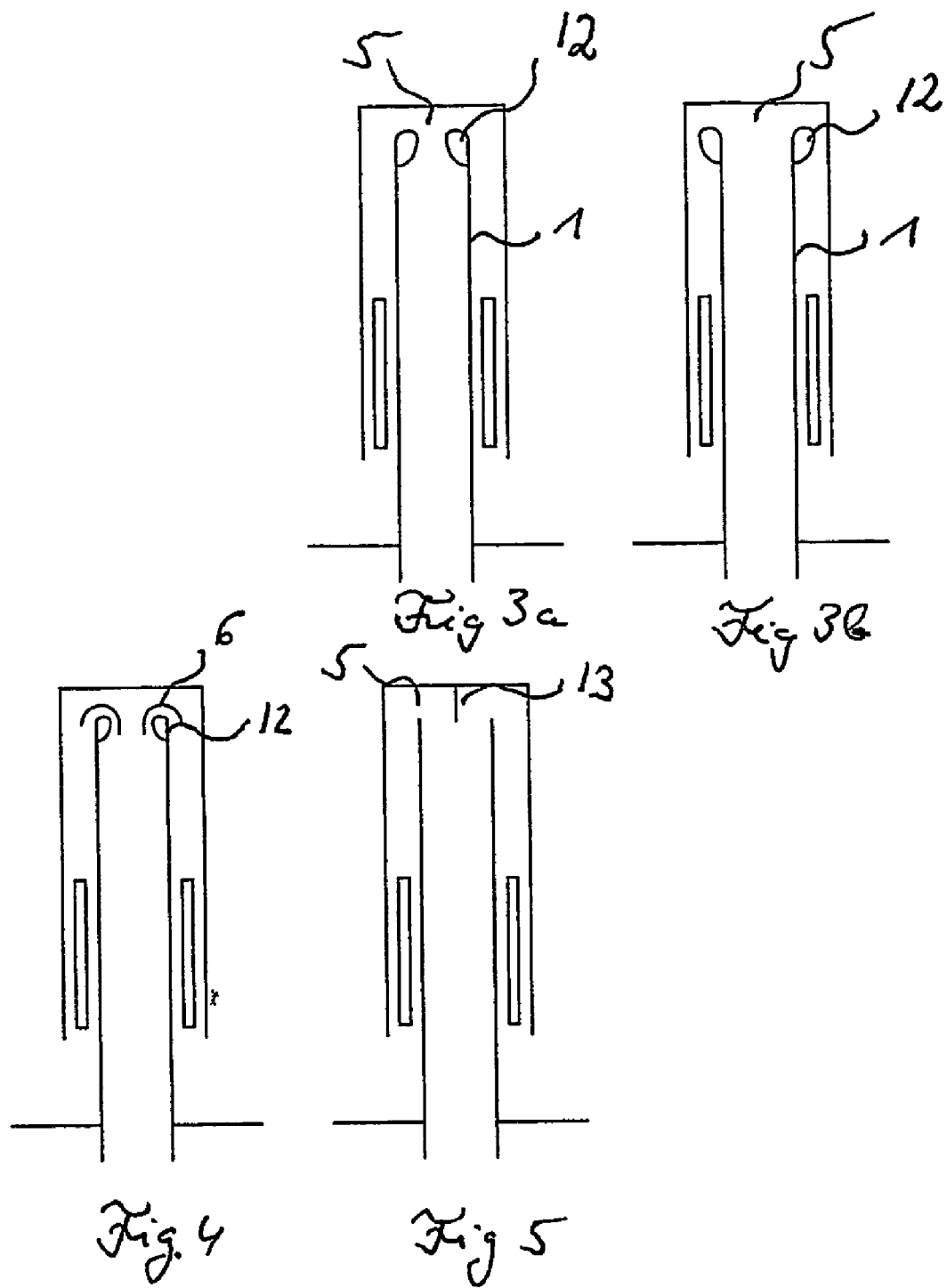

VAPOUR-LIQUID DISTRIBUTION TRAY

BACKGROUND OF THE INVENTION

The present invention relates to liquid-vapour distribution devices for use in two-phase concurrent down-flow vessels. In particular, the invention concerns a liquid distribution tray being equipped with vapour lift tubes that improve distribution of liquid and vapour phases over the cross sectional area of a vessel beneath the tray to achieve thermal and compositional equilibrium. The device is in particular useful in hydroprocessing reactors.

The known designs of liquid distribution devices fall into one of five categories. The first is a series of troughs and overflow weirs to systematically subdivide the liquid into multiple streams before it contacts the bed. This type is often used in liquid contractors or countercurrent absorbers. An example of this type is described in U.S. Pat. No. 5,192,465.

A second type of liquid distribution device is a perforated horizontal tray. This may or may not have notched weirs around the perforations. The tray may also have chimneys for vapour flow. This type of distribution device can be used for rough liquid distribution in conjunction with a more sophisticated final liquid distribution tray. Examples of this type are disclosed in U.S. Pat. No. 4,836,989.

The third common type of liquid distribution device is a chimney tray. This device uses a number of standpipes laid out typically on a regular square or triangular pitch pattern on a horizontal tray. The stand pipes typically have holes in the sides for the passage of liquid. The tops of the standpipes are open to allow vapour flow down through the centre of the chimneys. Some designs use special vapour downcomer chimneys to handle the bulk of the vapour flow. This type is known from U.S. Pat. Nos. 4,126,540 and 3,353,924.

The fourth type of liquid distribution device is a bubble cap tray. This device uses a number of bubble caps laid out on a regular-pitched pattern on a horizontal tray. The bubble cap is formed with a cap centered concentrically on a standpipe. The sides of the cap are slotted for vapour flow. Liquid flows under the cap and, together with the vapour, flows upward in the annular area and then down through the centre of the standpipe as described in U.S. Pat. No. 5,158,714.

A further known type of liquid distribution device is perforated tray provided with vapour lift tubes in form of a long legged downcomer fitted with one or more short legged upcomers creating an up-flow zone and down-flow zone within the tube. The sides of the short legged upcomer are slotted in the vapour lift tubes, liquid flowing concurrently with vapour is lifted by means of the vapour flow upwardly in an up-flow zone and evenly distributed together with the vapour through the down-flow zone to an underlying catalyst bed as further described in U.S. Pat. No. 5,942,162.

SUMMARY OF THE INVENTION

This invention is an improved liquid-vapour distribution device for use in two-phase concurrent down-flow vessels. The distribution device according to the broadest embodiment of the invention comprises a horizontal tray being perforated with holes. Each perforation being fitted with a vapour lift tube consisting of at least one elongated up-flow leg and one down-flow leg and creating at least one up-flow zone and a down-flow zone between the up-flow zone and down-flow zone a transition zone. In order to improve distribution performance of the device a bluff body is arranged within the transition zone of the vapour lift tube and/or in a region of the up-flow or down-flow zone adjacent to the transition zone of the vapour lift tube.

The term "bluff body" as used herein above and in the following description means a shaped body directing a moving fluid form the up-flow zone to the down-flow zone without creating considerable flow resistance.

The bluff body may be formed in any shape improving the flow stability and thereby creates lower distribution sensitivity against levelness of the tray.

Useful shapes of the bluff body are guide vanes curving towards the legs of the vapour lift and/or fairings as shown in the attached drawings.

The tray according to the invention is horizontally supported in the vessel. The tray can be either a sectionalised or solid plate. Whether sectionalised or solid all tray edges are tightened with gasket or otherwise sealed to provide an essentially leak free surface.

The tray is perforated by evenly spaced holes across its surface. The holes may be round, square, rectangular or any other geometric shape. The holes are optimally spaced on either a square, triangular, radial or other symmetrical pattern. If the horizontal tray is sectionalised, the perforation holes may be located optimally on each tray section. In all cases, an optimised pattern is used to provide approximately even spacing between all perforations and to provide an approximately even ratio of perforation hole area to horizontal tray area across the entire horizontal tray.

In one embodiment of the invention, each perforation is fitted with an M-shaped vapour lift tube being equipped with a guide vane and/or fairing. The vapour lift tubes are attached to the tray in such a way as to be leak tight.

In a further embodiment the vapour lift tubes are shaped in form of an inverted U.

On the bottom side of the tray, a drip edge may be created for each perforation by means of downcomer leg of the vapour lift tube extending through the tray or by a separate tube piece attached to the tray. The drip edge may further be formed by extrusions on the tray or by equivalent means.

BRIEF DESCRIPTION OF THE DRAWINGS

FIGS. 3a, 3b, 4 and 5 show a sectional view of different shapes of a bluff body according to specific embodiments of the invention.

DETAILED DESCRIPTION OF THE INVENTION

Figure 1C:
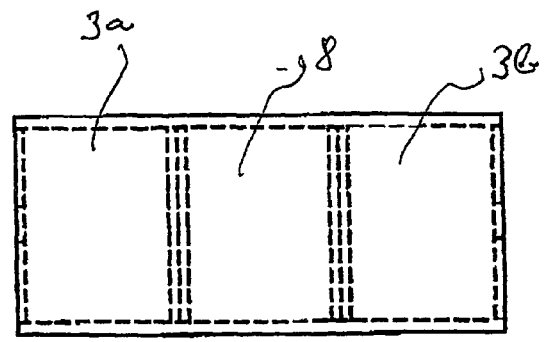
FIGS. 1A, 1B and 1C show the side elevation, the front elevation and a top view, respectively, of a first embodiment of the vapour lift tube of the present invention.
Figure 1A:
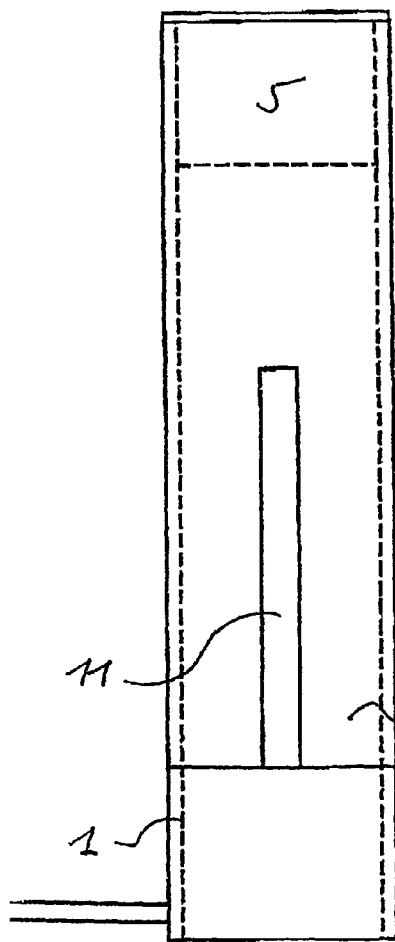
Figure 1B:
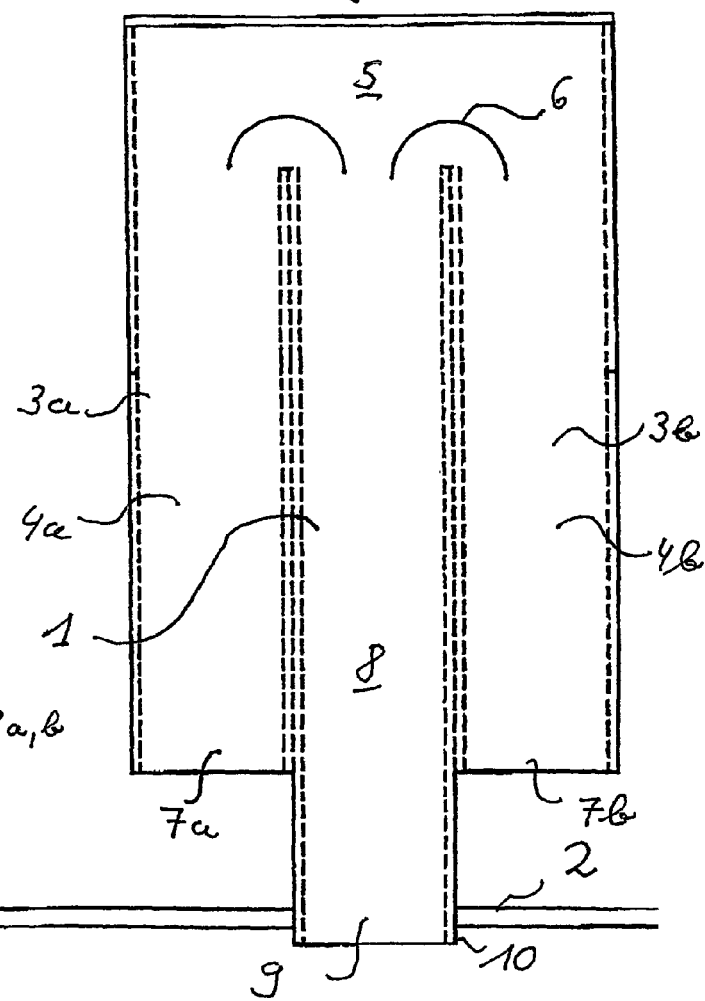

In a vapour lift tube according to a specific embodiment of the invention, shown in FIG. 1, down-flow leg 1 of the M-shaped vapour lift tube fits over or through a perforation in the support tray 2. Up-flow legs 3a and 3b are attached on each sidewall of down-flow leg 1 and are shorter than leg 1 to elevate inlet openings 7a and 7b of legs 3a and 3b above surface of tray 2. Up-flow legs 3a and 3b and down-flow leg 1 create up-flow zone 4a and 4b and down-flow leg 1 a down-flow zone 8. A transition zone 5 is formed between the legs 3a, 3b and 1. Transition zone 5 is equipped with guide vanes 6. The such shaped vapour lift tube provides a flow path across the tray through the inlet ends 7a and 7b to up-flow zones 4a and 4b within the walls of the short up-flow legs 3a and 3b legs in vertical flow direction. The flow is then forced into a horizontal direction in transition zone 5 and subsequently to vertical direction in down-flow zone 8. Finally, the flow of vapour and liquid is discharged through outlet end 9 at bottom of down-flow leg 8 at bottom surface of tray 2.

A vertical slots 11 (FIG. 1A) is cut into sidewall of leg 3a and 3b opposite to leg 1. Top of slots 11 is in line or below transition zone 5. Alternatively, two or more slots may be cut into sidewalls of legs 3a and 3b adjacent to or opposite wall of longer leg 1.

In operation of the above described tube, a liquid level will be established on tray 2. The liquid level on the vapour lift tube will be above inlet 7a, 7b of legs 3a, 3b and below top of slots 11. Vapour pass through the slot and creates pressure drop between up-flow zones 4a, 4b and outside of the vapour lift tube. Due to lower pressure inside the vapour lift tube, the liquid level will be higher in the up-flow zones than outside the vapour lift tube. Vapour and liquid mix in up-flow zones 4a, 4b and the vapour lifts the liquid to flow upwardly to transition zone 5. Liquid will partially disengage, while flowing over the connecting wall of legs 3a, 3b and 1 and downward through down-flow zone 8. At outlet 9 of zone 8, the liquid and vapour further disengages with the liquid draining off a drip edge 10.

Figures 2A, 2B, 2C:
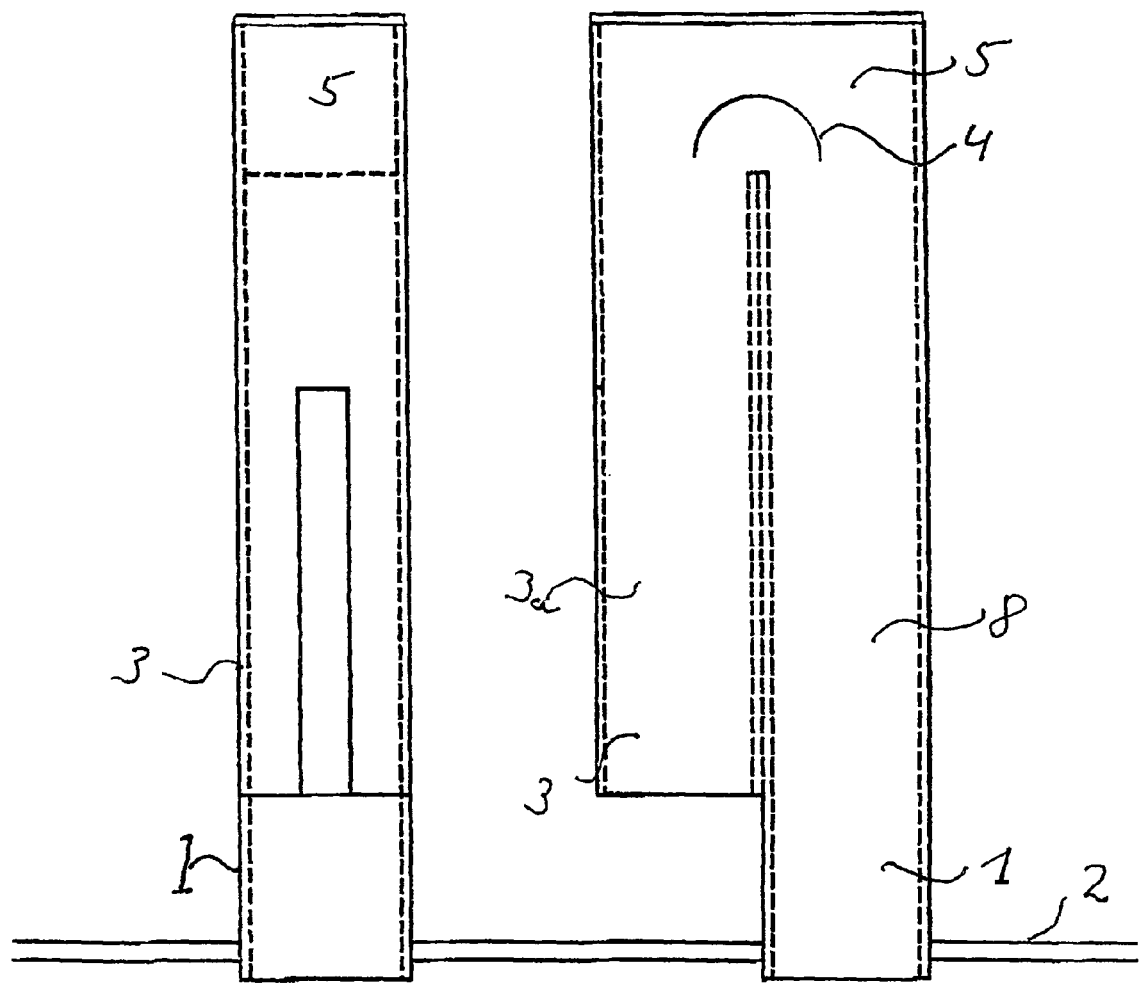
FIGS. 2A, 2B and 2C show the side elevation, the front elevation and a top view, respectively, of a further embodiment of the vapour lift tube of the invention.

In the embodiment shown in FIG. 2, a vapour lift tube is in form an inverted U. The tube is provided with a single up-flow leg 3 and down-flow leg 1 mounted in tray 2. The legs create a single up-flow zone 3a, a transition zone 5 and a down-flow zone 8. Transition zone 5 is provided with guide vane 4. This embodiment is particularly useful at low liquid and vapour loading on the distribution tray, whereas the vapour lift tube shown in FIG. 1 and described above can be designed to operate over a wide range of vapour-liquid loads.

An embodiment of the invention with fairings is shown in FIGS. 3a and b. In the embodiment fairings 12 are arranged on down-flow leg 1 either in the down-flow zone (FIG. 3a) or in the up-flow zone (FIG. 3b) in a region adjacent to transition zone 5.

FIG. 4 shows an embodiment with both fairings 12 and guide vanes 6 on top of down-flow leg 1.

FIG. 5 is an embodiment with an impingement plate 13 being provided in transition zone 5.

In a preferred embodiment of the invention, horizontal tray 2 is provided with a large number of small perforations, each having a hole area between 1 cm$^2$ and 25 cm$^2$. The total perforation hole area is between 4 and 33% of the horizontal tray surface area. The ratio of the up-flow zone cross section area to the perimeter is preferably above 4 mm to reduce frictional pressure drop and wall effects.

In reactors and processes where the distribution device according to the invention is employed, e.g. hydroprocessing reactors, wide variations may occur in the vapour and liquid phase rates and physical properties over time and during turndown operations. Due to fabricating tolerances and the care of installation, there will be unavoidable variations in the distribution tray levelness. Liquids being loaded onto the distribution tray from an inlet distributor or quench zone mixer may be unevenly distributed and may result in liquid height gradients across the tray due to splashing, waves or hydraulic head. An optimised liquid distributor design using the concept of this invention will provide improved liquid distribution below the tray than can be obtained from optimised designs of other types of distributors.

By means of an even distribution of the liquid reactants over the entire reactor cross sectional area all the catalyst at a given level is evenly wetted. Thus, all the catalysts at a given level operate at the same efficiency, which increases the overall efficiency of the reactor. Additionally, even liquid distribution maintains even radial temperature profiles across the reactor. This results in minimizing peak reactor temperatures which reduces cocking and catalyst deactivation rate. Consequently, the reactor operates more efficiently and with a longer cycle length.

The vapour lift tube according to the invention is an improvement of the vapour lift tube described in U.S. Pat. No. 5,942,162 and provides a lower sensitivity towards out of levelness placement of a distribution tray in a reactor.

Comparison tests with a vapour lift tray as described in U.S. Pat. No. 5,942,162 and the vapour lift tray according to the invention were carried out with liquid loadings ranging from 10-30 ton/hr/m$^2$. The vapour lift tray according to the invention provided sensitivity improvements of more than 30% at the same operating conditions as employed with the known tray. At the tests M shaped vapour lift tubes having the same dimensions were used with the exception that in the tubes according to the invention a bluff body in form of guide vane was arranged as described herein before.

The invention claimed is:

1. A liquid-vapour distribution device for use in two-phase concurrent down-flow vessels, comprising:
    a level, horizontal tray being perforated with holes, each perforation through the horizontal tray being fitted with a vapour lift tube,
    wherein the vapour lift tube consists of at least one elongated up-flow leg and one down-flow leg creating one or two up-flow zones, a down-flow zone and a transition zone between the up and down-flow zones, the one or two up-flow legs of the vapour lift tube are fitted along the down-flow leg so that each up-flow leg is non-concentric with respect to the down-flow leg; and
    a fairing or a guide vane arranged in a region of the up-flow or down-flow zone adjacent to the transition zone of the vapour lift tube, wherein the fairing or the guide vane is provided on top of the legs, the fairing or the guide vane curving towards the legs of the vapour lift tube, to provide even liquid distribution below the tray.

2. The liquid-vapour distribution device of claim 1, wherein one or more fairings are arranged on the down-flow leg adjacent to the transition zone of the tube.

* * * * *

UNITED STATES PATENT AND TRADEMARK OFFICE
CERTIFICATE OF CORRECTION

PATENT NO.         : 7,600,742 B2
APPLICATION NO. : 10/583561
DATED                 : October 13, 2009
INVENTOR(S)       : Rasmus Breivik It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 674 days.

Signed and Sealed this

Fifth Day of October, 2010

David J. Kappos
*Director of the United States Patent and Trademark Office*